(12) United States Patent
Amtmann

(10) Patent No.: US 7,257,092 B2
(45) Date of Patent: Aug. 14, 2007

(54) METHOD OF COMMUNICATING BETWEEN A COMMUNICATION STATION AND AT LEAST ONE DATA CARRIER

(75) Inventor: Franz Amtmann, Graz (AT)

(73) Assignee: NXP B.V., Eindhoven (NL)

( * ) Notice: Subject to any disclaimer, the term of this patent is extended or adjusted under 35 U.S.C. 154(b) by 1109 days.

(21) Appl. No.: 10/095,401

(22) Filed: Mar. 11, 2002

(65) Prior Publication Data

US 2002/0131453 A1 Sep. 19, 2002

(30) Foreign Application Priority Data

Mar. 13, 2001 (EP) .................................. 01890073

(51) Int. Cl.
*H04B 7/005* (2006.01)
(52) U.S. Cl. ........................ 370/278; 370/381; 370/329
(58) Field of Classification Search ................ 370/204, 370/389, 278, 282, 252, 328, 329, 349, 381; 370/456, 561; 455/524, 432.1, 432; 714/752; 375/140, 145; 704/203; 713/193; 710/10
See application file for complete search history.

(56) References Cited

U.S. PATENT DOCUMENTS

| | | | |
|---|---|---|---|
| 6,246,875 B1 * | 6/2001 | Seazholtz et al. | 455/432.1 |
| 6,725,056 B1 * | 4/2004 | Moles et al. | 455/524 |
| 2002/0112172 A1 * | 8/2002 | Simmons | 713/193 |
| 2003/0131302 A1 * | 7/2003 | Nobelen | 714/752 |

* cited by examiner

*Primary Examiner*—John Pezzlo
(74) *Attorney, Agent, or Firm*—Peter Zawilski

(57) ABSTRACT

In a method of communicating between a communication station (1) and at least one data carrier (2 (DC)) comprising an information data block (IDB) and useful data (UD=N× UDB), an inventorization procedure with successive procedure runs is carried out at least one part of a block region (NKP-IDB) of the identification data block (IDB) not yet known in the communication station (1) and, in addition, specific useful data (n×UDB) are transmitted from each data carrier (2 (DC)) to the communication station (1) in the implementation of the inventorization procedure, such that after termination of the inventorization procedure at least one part of the identification data block (IDB) of each data carrier (2 (DC)) and the associated specific useful data (n×UDB) are known in the communication station (1).

22 Claims, 6 Drawing Sheets request command correspond to "Inventory + Transmit"

time slots are determined by 4 bits in front of the mask

METHOD OF COMMUNICATING BETWEEN A COMMUNICATION STATION AND AT LEAST ONE DATA CARRIER

The invention relates to a method of communicating between a communication station and at least one data carrier, and to a communication station, a station circuit, a data carrier, a data carrier circuit which are suitable for carrying out such a method. A substantial fact concerning the method in discussion here consists in that an inventorization procedure is carried out which may consist of successive procedure runs, which consists of at least one such procedure run, and by means of which, after its termination, of data carriers present in a communication region of the communication station at least one part of an identification data block stored in such a data carrier is known in the communication station, and in that a transmission of specific useful data to the communication station is carried out by such a data carrier.

A method having the abovementioned process steps is described in the ISO/IEC15693-3 standard, and is therefore known. In a variant of this known method, the first step is to carry out an inventorization procedure, which usually consists of a plurality of procedure runs and in which so many procedure runs are carried out until the identification data blocks stored in the data carriers, also denoted serial numbers, of all data carriers present in a communication region of the communication station are known in the communication station and are thereby stored in the communication station, after which an interrogation command is communicated during a further additional section of the known method by the communication station to each inventorized, i.e. identified data carrier, the result of the command being that the useful data stored and consequently included in the relevant data carrier and determined in this case by the interrogation command, said useful data being a specific number of useful data blocks, are transmitted to the communication station. The actual transmission of the specific useful data desired and/or required in the communication station, i.e. the desired useful information, is therefore performed after the inventorization procedure in the known method, and this is accompanied by the general disadvantage that the duration of the method as a whole is relatively long, i.e. it takes a relatively long time until the useful information stored in a plurality of data carriers is available in the communication station in an acceptable and unmistakable way.

The invention has for its object to eliminate the problems set forth above and to implement an improved method, an improved communication station, an improved station circuit, an improved data carrier, and an improved data carrier circuit.

In order to achieve the object set forth above, features according to the invention are provided in the case of a method in accordance with the invention, such that a method in accordance with the invention can be characterized as follows:

A method of communicating between a communication station and at least one data carrier, which data carrier comprises an identification data block characteristic of it and useful data, by which method an inventorization procedure is carried out, which inventorization procedure may consist of successive procedure runs and consists of at least one procedure run, and owing to which inventorization procedure after its termination at least one part of the identification data block of the at least one data carrier is known in the communication station, and by which method a transmission of specific useful data is carried out from the at least one data carrier to the communication station such that during the implementation of the inventorization procedure at least one part of a block region of the identification data block not yet known in the communication station and, in addition, said specific useful data are transmitted from the at least one data carrier to the communication station.

In order to achieve the object set forth above, features according to the invention are provided in the case of a communication station in accordance with the invention such that a communication station in accordance with the invention can be characterized as follows:

A communication station for communicating with at least one data carrier, which data carrier comprises an identification data block characteristic of it and useful data, which communication station comprises inventorization means for carrying out an inventorization procedure, which inventorization means are designed for carrying out successive procedure runs in an inventorization procedure, and in which inventorization means at least one part of the identification data block of the at least one data carrier is known after termination of an inventorization procedure, and which communication station comprises processing means for processing specific useful data included in the at least one data carrier, transmitted to the communication station, and received in the communication station, wherein the communication station is designed for processing at least one part of a block region, not yet known in the communication station, of the identification data block of the at least one data carrier and, in addition, specific useful data of the at least one data carrier during the carrying out of an inventorization procedure.

In order to achieve the object set forth above, features according to the invention are provided in the case of a station circuit in accordance with the invention such that a station circuit in accordance with the invention can be characterized as follows:

A station circuit for a communication station for communicating with at least one data carrier, which data carrier comprises an identification data block characteristic of it and useful data, which station circuit comprises inventorization means for carrying out an inventorization procedure, which inventorization means are designed for carrying out successive procedure runs in an inventorization procedure, and in which inventorization means at least one part of the identification data block of the at least one data carrier is known after termination of an inventorization procedure, and which station circuit comprises processing means for processing specific useful data included in the at least one data carrier, transmitted to the station circuit, and received in the station circuit, wherein the station circuit is designed for processing at least one part of a block region, not yet known in the communication station, of the identification data block of the at least one data carrier and, in addition, the specific useful data of the at least one data carrier during the carrying out of an inventorization procedure.

In order to achieve the object set forth above, features according to the invention are provided in the case of a data carrier in accordance with the invention such that a data carrier in accordance with the invention can be characterized as follows:

A data carrier for communicating with a communication station, in which data carrier it is possible to store an identification data block characteristic of it and useful data, and which data carrier is designed for carrying out an inventorization procedure, which inventorization procedure may consist of successive procedure runs and consists of at least one procedure run, and owing to which inventorization procedure after its termination at least one part of the identification data block, included in the data carrier after its storage, of the data carrier is known in the communication station, and which data carrier comprises output means for outputting to the communication station specific useful data included in the data carrier after their storage, wherein the data carrier is designed for outputting at least one part of a block region, not yet known in the communication station, of the identification data block of the data carrier included in the data carrier after its storage and, in addition, specific useful data of the data carrier included in the data carrier after their storage during the carrying out of the inventorization procedure.

In order to achieve the object set forth above, features according to the invention are provided in the case of a data carrier circuit in accordance with the invention such that a data carrier circuit in accordance with the invention can be characterized as follows:

A data carrier circuit for a data carrier for communicating with a communication station, in which data carrier circuit it is possible to store an identification data block characteristic of it and useful data, and which data carrier circuit is designed for carrying out an inventorization procedure, which inventorization procedure may consist of successive procedure runs and consists of at least one procedure run, and owing to which inventorization procedure after its termination at least one part of the identification data block, included in the data carrier circuit after its storage, of the data carrier circuit is known in the communication station, and which data carrier circuit comprises output means for outputting specific useful data, included in the data carrier circuit after their storage, to the communication station, wherein the data carrier circuit is designed for outputting at least one part of a block region of the identification data block, not yet known in the communication station, of the data carrier circuit included in the data carrier circuit after its storage, and, in addition, specific useful data of the data carrier circuit, included in the data carrier circuit after their storage during the carrying out of the inventorization procedure.

An improved method, an improved communication station, an improved station circuit, an improved data carrier, and an improved data carrier circuit are obtained by means of the provision of the features in accordance with the invention in a way which is very simple and can be implemented both with the aid of a hard-wired logic circuit and with the aid of a programmable circuit, a very important improvement consisting in that a method in accordance with the invention has a method duration substantially shorter than the method duration of the known method, which is very advantageous for achieving as short as possible a communication time between a communication station and a plurality or a multiplicity of data carriers, because this ensures that the useful information from a multiplicity of data carriers is known in the communication station even in the case of a short communication duration and can therefore be processed and evaluated in the communication station.

It has proved to be particularly advantageous in the case of a method, a communication station, a station circuit, a data carrier, and a data carrier circuit in accordance with the invention when, additional features (e.g., various inventorization methods involving the entire block region (NKP-IDB) of the identification data block (IDB) not yet known in the communication station) and, in addition, the specific useful data (nxUDB) are transmitted from the at least one data carrier (2 (DC)) to the communication station (1), as discussed herein, are provided. This is advantageous for achieving a good compromise between, on the one hand, as short as possible a communication duration and, on the other hand, a high inventorization accuracy or identification accuracy.

It has, however, proved to be particularly advantageous in the case of a method, a communication station, a station circuit, a data carrier, and a data carrier circuit in accordance with the invention when, additional features (e.g., the entire identification data block and, in addition, the specific useful data are transmitted from the at least one data carrier to the communication station), as discussed herein, are provided. Such a design constitutes a good compromise between a short communication duration and a design that can be realized and/or programmed as simply as possible.

It has further proved to be very advantageous in the case of a method, a communication station, a station circuit, a data carrier, and a data carrier circuit in accordance with the invention when, additional features (e.g., the specific useful data (nxUDB) are transmitted in time after the data (NKP-IDB) from the identification data block (IDB)), as discussed herein, are provided. Such a solution is advantageous because a simple logic implementation suffices in this solution, and because a particularly high identification accuracy is ensured. However, it may be mentioned at this juncture that it is also possible for the specific useful data to be transmitted from a data carrier to the communication station before the data from the identification data block.

In a solution in which the specific useful data are transmitted after the data from the identification data block, a time interval may lie between the transmission of the data from the identification data block and the transmission of the specific useful data, and this may be advantageous for some applications, for example whenever after checking of the data from the identification data block or after establishing what is termed a collision with reference to the data transmission from at least two data carriers to the communication station, the envisaged subsequent transmission of the specific useful data is to be deliberately suppressed. However, it has proved to be particularly advantageous when the specific useful data are transmitted immediately subsequent to the data from the identification data block, because as short as possible a communication duration is obtained in this way.

It has proved, furthermore, to be very advantageous when in the case of a method in accordance with the invention the features in accordance with claim 6 are additionally provided. This solution offers the advantage that the time required in an inventorization procedure for processing the procedure run becomes increasingly shorter, because the length of the block region of the identification data block of each data carrier not yet known in the communication station becomes smaller as the number of completed procedure runs increases.

These and further aspects of the invention will be clarified in the following description of an embodiment and are explained with reference to this embodiment.

The invention will be described in more detail below with reference to an embodiment illustrated in the drawings, to which, however, the invention is not limited.

Figure 7:
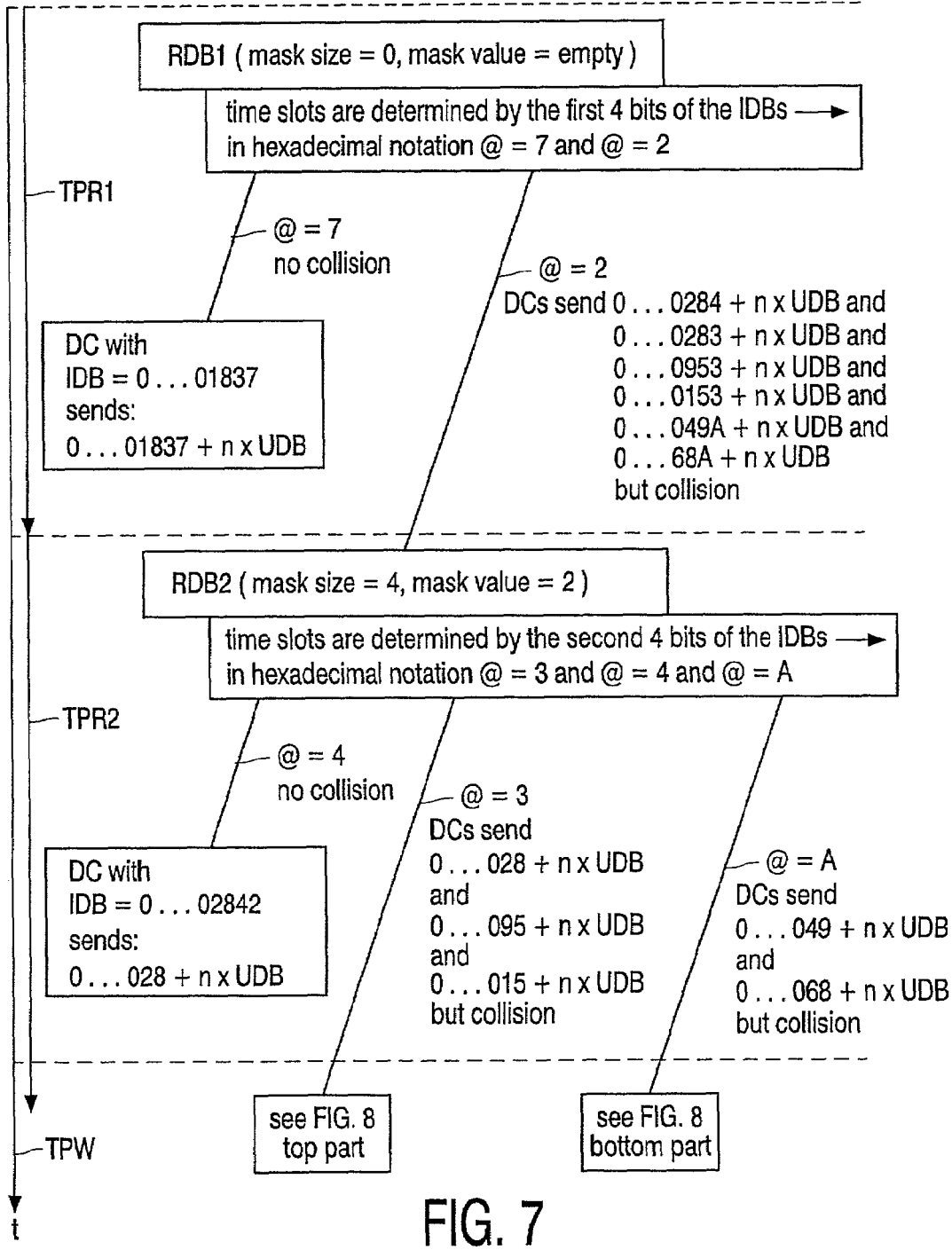
Figure 8:
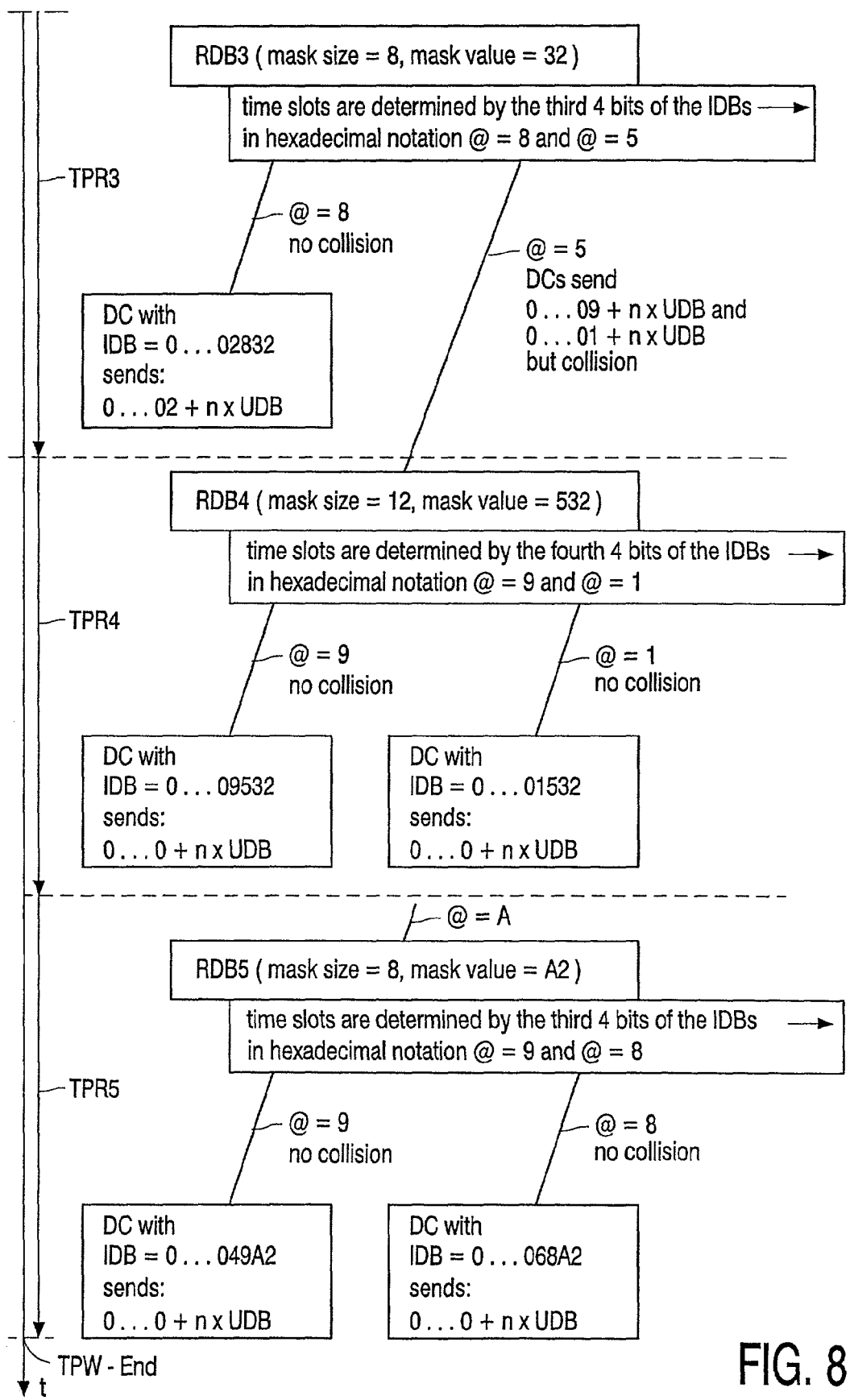

FIGS. 7 and 8 each show diagrammatically part of a sequence of the method in accordance with the invention wherein an inventorization of seven data carriers is carried out.

Figure 1:
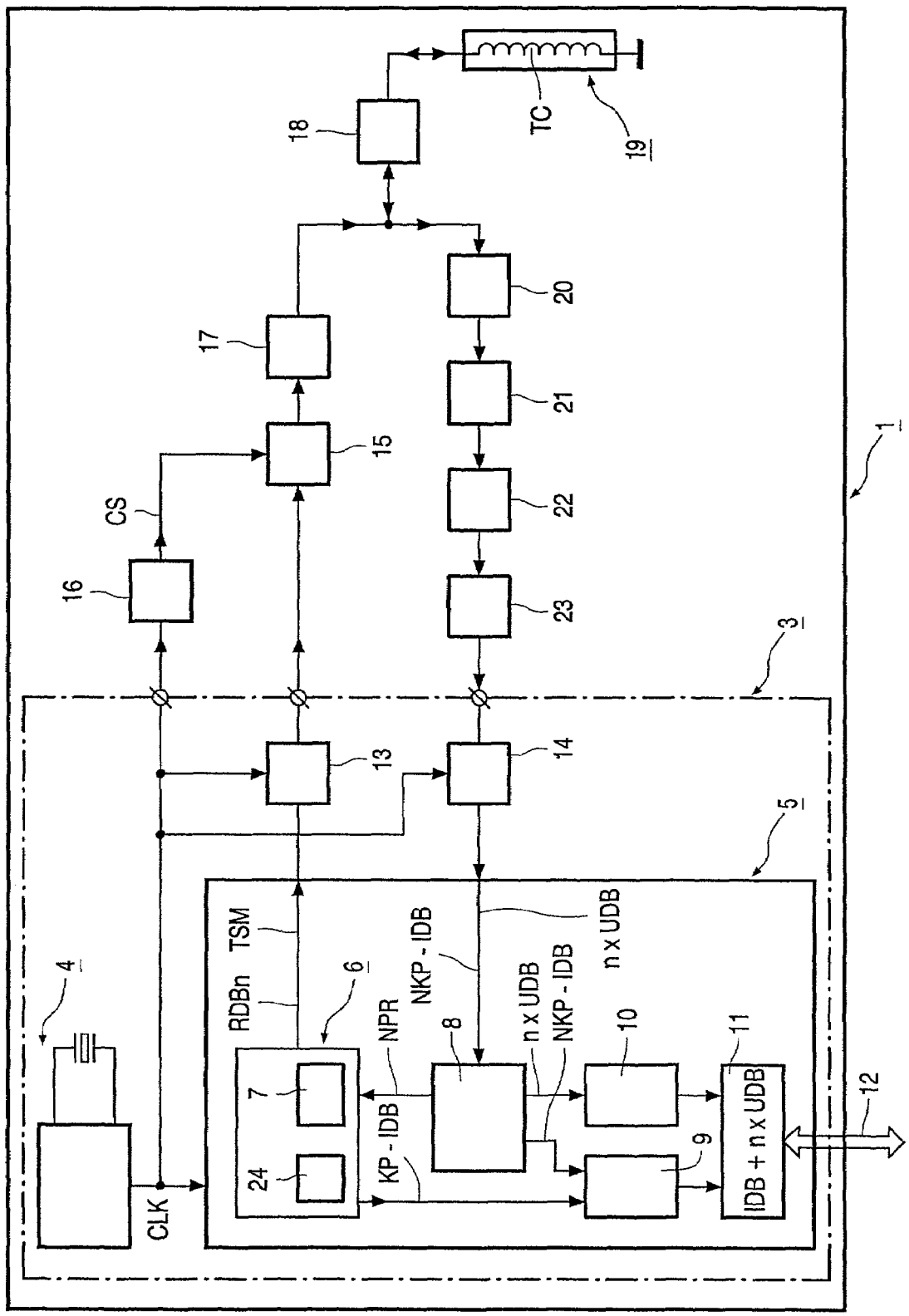
FIG. 1 is a diagrammatic block diagram of a part, essential in the present context, of a communication station and a station circuit in accordance with an embodiment of the invention.
Figure 2:
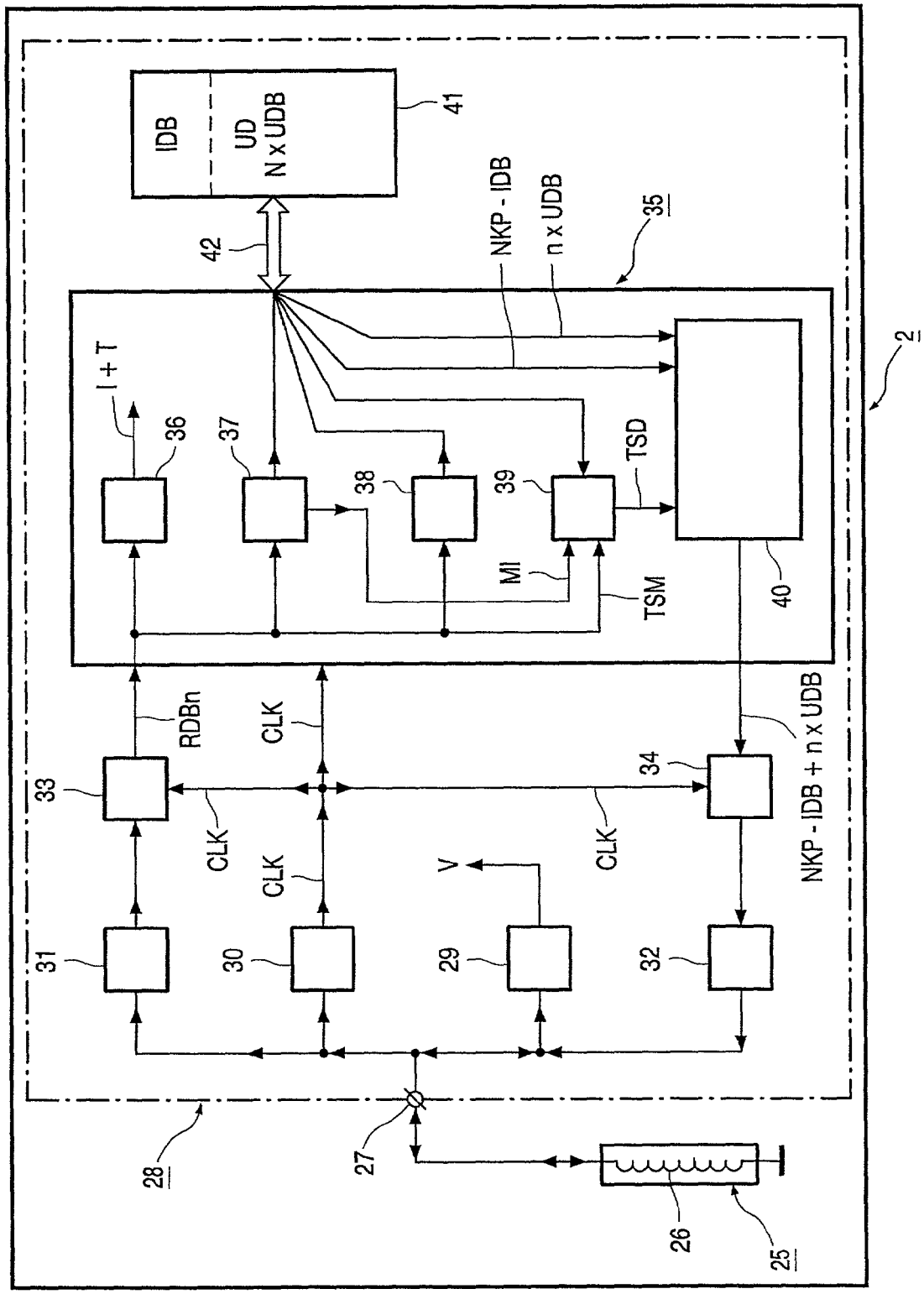
FIG. 2 is a block diagram of a part, essential in the present context, of a data carrier and a data carrier circuit in accordance with an embodiment of the invention.

A communication station 1 is illustrated in FIG. 1. The communication station 1 is provided and designed for communicating with at least one data carrier 2. Such a data carrier 2 is illustrated in FIG. 2 and will be described in further detail below. It may already be mentioned here that the data carrier 2 contains an identification data block IDB characteristic of this data carrier 2 and useful data UD, these useful data UD being included in the form of N useful data blocks UDB in the data carrier 2.

The communication station 1 comprises a station circuit 3 which is formed in the present case by a microcomputer, but which may alternatively be formed by a hard-wired logic circuit. The station circuit 3 comprises a clock signal generator 4 capable of generating a clock signal CLK. The station circuit 3 further comprises inventorization means 5 which are provided and designed for carrying out an inventorization procedure. In this case, the inventorization means 5 are designed for carrying out successive procedure runs in an inventorization procedure. After termination of such an inventorization procedure, at least one part of the identification data block IDB of each data carrier 2 is known in the inventorization means 5, the design being made in the case described here with reference to FIGS. 1 and 2 such that after the termination of an inventorization procedure the entire identification data block of each data carrier 2 is known in the inventorization means 5 and is stored in the inventorization means 5, specifically by each data carrier 2 which was in communicative connection with the communication station 1 in the inventorization procedure.

The inventorization means 5 comprise request generation means 6 which are designed for generating request data blocks RDBn and time slot marks TSMs. A time slot counter 7 and mask generating means 24 are included in the request generation means 6. Furthermore, the inventorization means 5 comprise collision detecting means 8 with the aid of which a "collision" can be detected, such a collision being understood to imply that data that cannot be distinguished uniquely from one another are received simultaneously from at least two data carriers 2 in the communication station 1. If the collision detecting means 8 establish no collision, they are designed such that they relay a block region NKP-IDB, not yet known in the communication station 1, of a data carrier 2 to identification data block regeneration means 9 of the inventorization means 5, and relay specific useful data nxUDB to useful data processing means 10 of the inventorization means 5. If the collision detecting means 8 do establish a collision, they will suppress such relaying to the identification data block regeneration means 9 and the useful data processing means 10.

The identification data block regeneration means 9 are provided and designed for generating each time one complete identification data block IDB of each data carrier 2 which was in collision-free communicative connection with the communication station 1. For this purpose, on the one hand the identification data block regeneration means 9 are fed said block region NKP-IDB, not yet known in the communication station 1, of the identification data block IDB of each data carrier 2, and on the other hand the identification data block regeneration means 9 are additionally fed the block region KP-IDB, already known in the communication station 1, of the identification data block IDB of each data carrier 2, specifically from the request regeneration means 6, in which request regeneration means 6 the block region KP-IDB, already known in the communication station 1, of the identification data block IDB of each data carrier 2 is known.

The inventorization means 5 further comprise combination means 11 to which both the entire identification data block IDB of each data carrier 2 generated by the identification data block regeneration means 9 and the specific data nxUDB of each data carrier 2 transmitted from each data carrier 2 to the communication station 1 can be fed. The data fed are processed in the combination means 11, both the relevant identification data block IDB and the specified useful data nxUDB being stored for each data carrier 2 which has been in communicative connection with the communication station 1, specifically in a way uniquely attuned to one another. The data included in these combination means 11 can be fed by the combination means 11 via a data connection 12, for example, a so-called host computer.

The station circuit 3 further includes coding means 13 and decoding means 14 to which the clock signal CLK can be fed. The coding means 13 are provided and designed for coding the data or signals fed to the coding means 14 in an uncoded way, i.e. also for coding the request data blocks RDBn and the time slot marks TSM, which are output in this case by the request generation means 6 of the inventorization means 5. The decoding means 14 are provided and designed for decoding data and signals fed to them in a coded way. Decoded data output by the decoding means 14, for example an identification data block IDB or a block region NKP-IDB of an identification data block IDB not yet known in the communication station 1 or specific useful data nxUDB can be fed to the collision detecting means 8 of the inventorization means 5.

The communication station 1 further includes a modulator 15 which is connected on the one hand to the coding means 13 and on the other hand to a carrier signal generator 16, which carrier signal generator 16 is fed the clock signal CLK, and which carrier signal generator 16 generates a carrier signal CS, which is fed to the modulator 15, on the basis of the clock signal CLK. Amplitude modulation of the carrier signal CS can be carried out by the modulator 15 as a function of the data output in coded form from the coding means 13. Connected to the modulator 15 is a first amplifier stage 17 of the communication station 1, by means of which an amplified modulated signal can be generated which is fed to matching means 18, which matching means 18 ensure that the modulated signals fed to them are relayed to station transmission means 19. The station transmission means 19 comprise a station transmission coil TC and further electrical components (not illustrated). The modulated signals fed to the station transmission means 19 and their station transmission coil TC can be transmitted thereby to the data carriers 2 present in a communication region of the communication station 1. This transmission is performed in an inductive way in the case described here. It should be noted that this transmission may alternatively be performed by a capacitive or radio-frequency method.

The station circuit 3 is designed as an integrated circuit. In this case, it may also further comprise the components 15, 16, 17, 20, 21, 22 and 23.

The station transmission means 19 are provided not only for transmitting signals from the communication station 1 to the data carriers 2, but also for carrying out transmission from the data carriers 2 to the communication station 1. In this case, signals, load-modulated in this case, received by the station transmission means 19 are fed via the matching means 18 to an input filter stage 20 provided in the communication station 1. The input filter stage 20 is provided for filtering out undesired signal components. Connected to the input filter stage 20 is a demodulator 21 by means of which the signals generated in the data carriers 2 by load modulation and transmitted to the communication station 1 can be demodulated. Connected to the demodulator 21 is a further filter stage 22 which ensures filtering of the demodulated signals. Connected to the further filter stage 22 is a second amplifier stage 23 of the communication station 1, which ensures amplification of the demodulated and filtered signals. Said decoding means 14 of the station circuit 3 are connected to the second amplifier stage 23.

Figure 4:
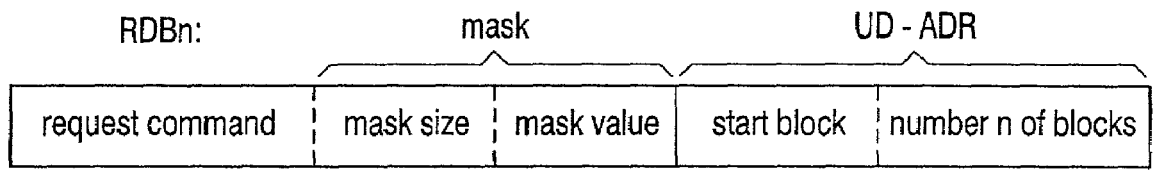
FIG. 4 is a diagram of the composition of a request data block which is used in the method in accordance with the invention.

Before examining the data carrier 2 illustrated in FIG. 2 in more detail, the design of the request data blocks RDBn will first be examined in more detail, specifically with reference to FIG. 4. As may be seen from FIG. 4, each request data block RDBn consists of a request command and a mask which consists of an item of information about the mask length in bits (mask size) and an item of information about the content or the value of the mask (mask value), and of an item of useful data address information UD-ADR, which consists of an item of information about a useful data start block and an item of information as to the number n of useful data blocks (number n of blocks).

Figure 5:
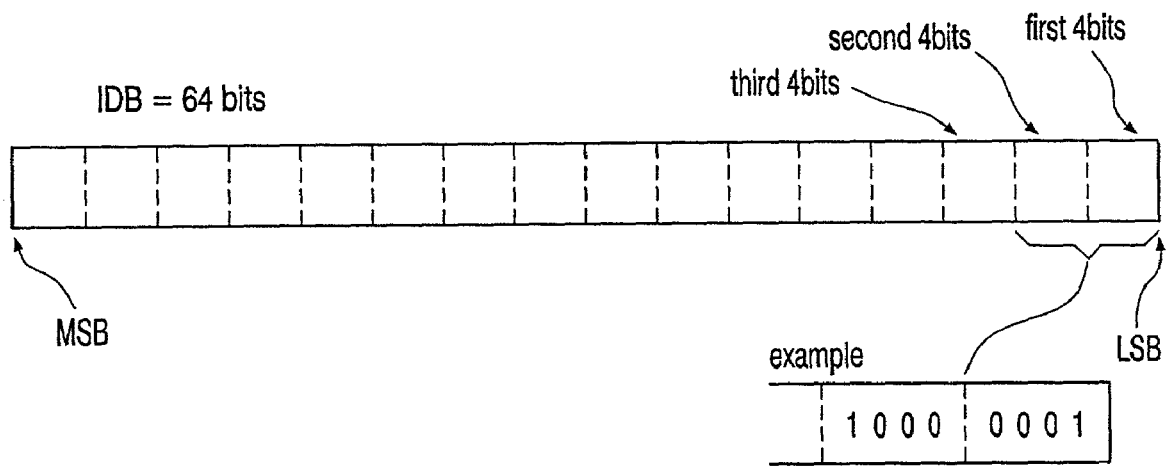
FIG. 5 is a diagram of an identification data block which is stored in a data carrier in accordance with the invention.

Furthermore, the structure of the identification data block IDB of each data carrier 2 may be explained in preparation with reference to FIG. 5. As may be seen from FIG. 5, the identification data block IDB consists of all of sixty four (64) bits, which are arranged in sixteen (16) groups of four (4) bits each, the first four (4) bits lying in the region of the least significant bit LSB, and in this case the first four (4) bits are followed by the second four (4) bits and thereafter by the third four (4) bits. FIG. 5 further provides an example for the first four (4) bits and the second four (4) bits where the first four (4) bits are "0001", and the second four (4) bits are "1000".

In further preparation, an example of a mask will be discussed with reference to FIG. 6. The least significant component of an identification data block IDB is illustrated in FIG. 6, the eight (8) least significant bits corresponding to a mask which has a mask length (mask size) of eight (8) bits and a mask value of "32", the mask value being specified in hexadecimal form or notation.

Figure 6:
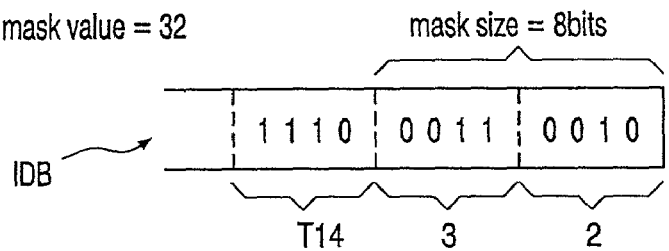
FIG. 6 is a diagram representing an example of a mask such as may occur in the method in accordance with the invention.

It should further be noted with reference to FIG. 6 that it is laid down in a communication protocol valid in the case described here for the communication station 1 and each data carrier 2 that the communication between the communication station 1 and the data carriers 2 is performed in the course of each procedure run of an inventorization procedure within a total of sixteen (16) time slots T, and that the number of that time slot T in which a data carrier 2 must come into communicative connection with the communication station 1 is fixed in each case by the four (4) bits coming before the bits fixed by the size of a mask, of the identification data block IDB of each data carrier 2. In the example illustrated in FIG. 6, the time slot T in which the data carrier 2, which includes the bits illustrated in FIG. 6 in its identification data block IDB, must come into communicative connection with the communication station 1 is therefore determined by the third four (4) bits, which are "1110" in the specified example, the result being that the relevant data carrier 2 in the fifteenth time slot of a procedure run will enter into communicative connection with the communication station 1, which fifteenth time slot has the designation T14, this being so because the time slot numeration between the first time slot and the sixteenth time slot is given by T0, T1, T2, T3 to T14 and T15, as may be seen from FIG. 3.

Figure 3:
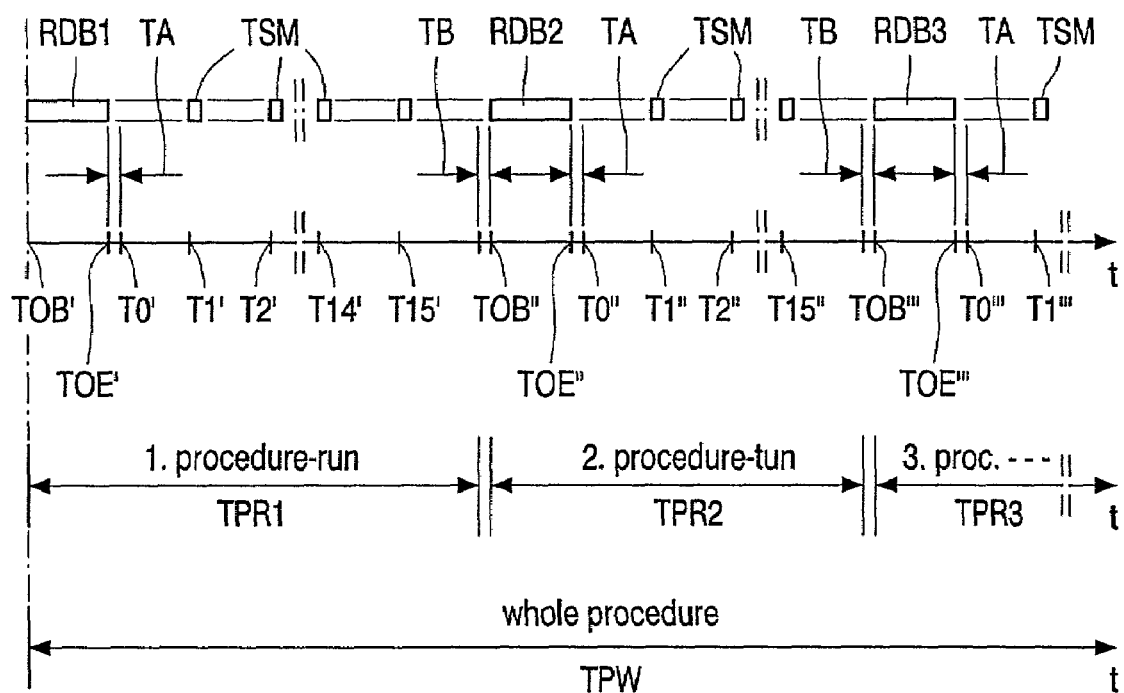
FIG. 3 is a diagram of signals, moments and time intervals which occur in the case of a method in accordance with the invention.

It may be explained at this point with reference to FIG. 3 that FIG. 3 depicts the method in accordance with the invention for the purpose of communication between the communication station 1 and at least one data carrier 2 in the form of three timing diagrams. The lowermost timing diagram here refers to the total time duration TPW (whole procedure) of the method in accordance with the invention, i.e. the inventorization procedure. The reference in the middle timing diagram is to the time periods TPR1, TPR2 and TPR3 of three procedure runs within the whole procedure of the method, i.e. the inventorization procedure, the time period TPR1 being valid for the first procedure run, and the time period TPR2 being valid for the second procedure run, and the time period TPR3 being valid for the third procedure run.

It may be seen from the first timing diagram that the first procedure run begins with the time period TPR1 at an instant TOB'. At this instant TOB', a first request data block RDB1 is output by the communication station 1 to all data carriers 2. The request data block RDB1 ends at the instant TOE'. After a given time delay TA after the end of the first request data block RDB1, a first time window T0' starts. A time slot mark TSM with which a second time slot T1' starts occurs at the end of the first time window T0'. The same procedure is repeated in a further sequence, such that a further time slot mark TSM starts a third time slot T2', just as the fifteenth time slot T14' and the sixteenth time slot T15' are started by subsequent time slot marks TSM. After the elapse of the sixteenth time slot T15' within the first procedure run with the time period TPR1, the second request data block RDB2 is output at the instant TOB" after the elapse of a time delay period TB. After the end TOE" of the second request data block RDB2, the time delay period TA elapses again until the first time slot T0" automatically occurs within the second procedure run with the time period TPR2. The further time slots T1", T2", . . . T15" are started again by time slot markings TSM. The same process as described above also occurs in the course of the third procedure run with the time period TPR3 and the further procedure runs.

As was noted above, the data carrier 2 is illustrated in FIG. 2. The data carrier 2 comprises data carrier transmission means 25 which include a data carrier transmission coil 26. The data carrier transmission means 25 are connected to a connection terminal 27 of a data carrier circuit 28. The data carrier circuit 28 is formed in the present case by an integrated circuit here.

The data carrier circuit 28 comprises four means which are connected to the connection terminal 27, specifically DC voltage generating means 29, clock signal regenerating means 30, demodulation means 31, and modulation means 32.

The DC voltage generating means 29 are provided and designed for generating a supply DC voltage V by using the signals received by means of the data transmission means 25. The supply voltage V is fed to all those constituents of the data carrier circuit 28 for whose function this supply DC voltage V is required, something which is, however, not illustrated in FIG. 2 for the sake of simplicity.

The clock signal regenerating means 30 are provided and designed for regenerating the clock signal CLK. The clock signal regenerating means 30 regenerate the clock signal CLK also from the signals received by means of the data transmission means 25. In the case of the data carrier 2, the regenerated clock signal CLK may be fed to decoding means 33 and coding means 34, as well as to a microcomputer 35.

The demodulation means 31 serve to demodulate modulated signals received by means of the data transmission means 25. For this purpose, the demodulation means 31 carry out an amplitude demodulation and output the demodulated signals to the decoding means 33, which decoding means 33 are provided and designed for decoding the demodulated signals. The decoding means 33 output decoded signals, for example also the request data blocks RDBn and the time slot marks TSM.

The modulation means 32 are provided and designed for load modulation of the carrier signal CS generated in the communication station 1, which carrier signal CS is transmitted, if data is to be transmitted to the communication station 1, to the respective data carrier 2 in an unmodulated way by the station transmission means 19 and the data carrier transmission means 25, it then being possible to carry out load modulation of the unmodulated carrier signal CS in the data carrier 2. Coded signals can be fed to the modulation means 32 by means of the coding means 34. In this case, uncoded signals or data can be fed to the coding means 34, for example the identification data block IDB of the data carrier 2 or else the block region NKP-IDB, not yet known in the communication station 1, of the identification data block IDB or specific useful data n×UDB.

The data carrier 2 or the data carrier circuit 28 comprises the microcomputer 35 mentioned above. It is also possible to provide a hard-wired logic circuit instead of the microcomputer 35. A multiplicity of means and functions are fulfilled by the microcomputer 35, but of these only those means and functions are examined here which are important in the present context. The same also holds for the station circuit 3 of the communication station 1, which circuit is formed by a microcomputer.

The microcomputer 35 comprises command detection means 36, mask detection means 37, block detection means 38, time slot detection means 39, and data processing means 40.

The command detection means 36 serve for detecting the request command included in a request data block RDBn, which has the consequence in the case described here that inventorization, i.e. an exact identification of each data carrier 2 and, simultaneously with this inventorization, a transmission of specific useful data n×UDB from each data carrier 2 to the communication station 1 are performed. The request command therefore constitutes a synonym for "inventorize" and "transmit". Consequently, the request command can be specified simply by the reference symbol combination I+T, as is done in FIG. 2 at the output of the command detection means 36. A program run required for carrying out the necessary runs is started in the microcomputer 35 by means of the request command I+T.

The mask detection means 37 are designed for detecting and evaluating the mask contained in the request data blocks RDBn. Depending on the detected mask, the mask detection means 37 have the effect that a block region NKP-IDB, fixed by the respective mask and not yet known in the communication station 1, of the identification data block IDB is read out from a memory 41 present in the data carrier 2 or in the data carrier circuit 28 of the data carrier 2 via a connection 42 and is entered into the microcomputer 35, whereby it is fed to the data processing means 40.

The block detection means 38 are designed for detecting the useful data address information UD-ADR included in the request data blocks RDBn. The useful data start block included in a request data block RDB and the number n of useful data blocks are detected by the block detection means 38, the result being that the block detection means 38 ensure that, beginning with the determined start block, a total of n useful data blocks UDB, i.e. n×UDB are read out as specific useful data, entered into the microcomputer 35, and fed to the data processing means 40 in the microcomputer 35, from among the useful data UD stored in the memory 41, which are stored in the form of N useful data blocks UDB, i.e. N×UDB.

The time slot detection means 39 are designed for detecting the respective time slot T. The time slot detection means 39 detect the beginning of the respective first time slot T0' or T0" etc. with the aid of the time period TA which elapses after the end of the occurrence of the respective request data block RDBn. The further time slots T are detected by the time slot detection means 39 by means of the time slot mark TSM occurring at the beginning of the respective time slot T. Depending on the detected time slot T, the time slot detection means 39 output to the data processing means 40 time slot data TSD which characterize the respective time slot T, with a prescribed delay, so as to achieve a waiting time in which transient phenomena can decay. In addition, an item of information MI is fed from the mask detection means 37 via the respective detected mask to the time slot detection means 39. As a function of the information MI fed from the mask detection means 37 to the time slot detection means 39 via the respective detected mask, the time slot detection means 39 read out in each case from the identification data block IDB via the connection 42 those four (4) bits which lie in front of the respective mask and which determine the time slot in which the relevant data carrier 2 must enter into communicative connection with the communication station 1. As soon as the time slot detection means 39 have established the activation of the time slot in which the data carrier 2 must enter into communicative connection with the communication station 1, the time slot detection means 39 output the relevant time slot data TSD to the data processing means 40 with the delay mentioned, the result of which is that the data buffered in the data processing means 40, i.e. the part NKP-IDB buffered in the data processing means 40 and not yet known in the communication station 1, of the identification data block IDB as well as the specific useful data blocks n×UDB are read out from the data processing means 40 and relayed to the coding means 34, something which will result in modulation by the modulation means 32 and transmission to the communication station 1 in a later stage.

In the communication station 1 of FIG. 1 and the data carrier of FIG. 2, a design is advantageously selected such that in the case of a method in accordance with the invention of communicating between the communication station 1 and the data carrier 2, only the block region NKP-IDB of the identification data block IDB not yet known in the communication station 1 and simultaneously the specific useful data n×UDB are transmitted from the data carrier 2 to the communication station 1 during the implementation of the inventorization procedure. In the method in accordance with the invention, in other words those parts of the identification data block IDB of a data carrier 2 which are already known in the communication station 1 are no longer transmitted from the relevant data carrier 2 to the communication station 1, something which is in no way required, since this relates to redundant information which is already available in any case in the communication station 1. Furthermore, the method in accordance with the invention is distinguished in that not only are parts of the identification data blocks IDB transmitted into the communication station 1 in the course of carrying out an inventorization procedure, but that during the inventorization procedure the specific useful data nxUDB desired and/or required in the communication station 1 are also simultaneously transmitted, the result being that, seen as a whole, a total communication duration suffices which is shorter by comparison with known methods. In order to render the advantages just mentioned easier to understand, a method in accordance with the invention will be explained below with the aid of an example, reference being made to FIGS. 7 and 8 for the sake of explanation.

In the upper part of FIG. 7, it is assumed that a total of seven data carriers 2 (DC) are located in the communication region of the communication station 1. It is further assumed in this case that these seven data carriers 2 (DC) include the identification data blocks IDB listed below, specifically:

0000000000001837
0000000000002842
0000000000002832
0000000000009532
0000000000001532
00000000000049A2
00000000000068A2

The above-listed data of the identification data blocks IDB, each of which consists of a total of sixty four (64) bits, are specified in hexadecimal form or notation.

The identification data blocks IDB listed above can be specified in hexadecimal notation, but in abbreviated form as follows:

0 . . . 01837
0 . . . 02842
0 . . . 02832
0 . . . 09532
0 . . . 01532
0 . . . 049A2
0 . . . 068A2

At the beginning of the communication method in which an inventorization procedure is carried out, the first request data block RDB1 is generated by the communication station 1 and output at all seven data carriers 2 (DC). The first request data block RDB1 includes the request command and also the useful data address information, something which is, however, not specified in FIG. 7. However, it is specified in FIG. 7 that the first request data block RDB1 includes a mask with a mask size=0 and no mask value. This mask is determined by the mask generating means 24. In this case, the time slot T in which the respective ones of the seven data carriers 2 (DC) must communicate with the communication station 1 is given by the first four (4) bits of its identification data block IDB, thus by its serial number. That is to say, in the present example, that the time slots T are determined in hexadecimal notation by @=7 and @=2. Consequently, a communication with the communication station 1 occurs in the time slots which are determined by @=7 and @=2 in the first procedure run with the time duration TPR1. In the time slot given by @=2, a total of six of the seven data carriers 2 (DC) communicate with the communication station 1, the data carrier 2 (DC) with the identification data block IDB=0 . . . 02842 transmitting the data 0 . . . 0284+nxUDB to the communication station 1. In a similar way, the data carrier 2 (DC) with the identification data block IDB=0 . . . 02832 transmits the data 0 . . . 0283+nxUDB to the communication station 1. In a similar way, the data carrier 2 (DC) with the identification data block IDB=0 . . . 09532 transmits the data 0 . . . 0953+nxUDB to the communication station 1. In a similar way, the data carrier 2 (DC) with the identification data block IDB=0 . . . 01532 transmits the data 0 . . . 0153+nxUDB to the communication station 1. In a similar way, the data carrier 2 (DC) with the identification data block IDB=0 . . . 049A2 transmits the data 0 . . . 049A+nxUDB to the communication station 1. In a similar way, the data carrier 2 (DC) with the identification data block IDB=0 . . . 068A2 transmits the data 0 . . . 068A+nx UDB to the communication station 1. It follows that a collision will occur in the time slot given by @=2, the result being that the collision detection means 8 detect the occurrence of this collision and ensure that an item of control information NPR is output to the request generating means 6, whereby a second procedure run is started, specifically after expiry of the first procedure run with the duration TPR1.

It may be mentioned at this juncture that the identification data blocks IDB or the parts NKP-IDB of the identification data blocks IDB are always transmitted from the data carriers 2 to the communication station 1 starting from the least significant bit LSB.

During the first procedure run with the duration TPR1, data is transmitted from the data carrier 2 (DC) with the identification data block IDB=0 . . . 01837 to the communication station 1 in the time slot given by @=7, no collision occurring in the case of this data transmission. In the case of the data transmission from the data carrier 2 (DC) with the identification data block IDB=0 . . . 01837 to the communication station 1, the data 0 . . . 0183+nxUDB are transmitted to the communication station 1, after which this data carrier 2 (DC) is inventorized with the aid of the data. As may be seen, it follows that of the entire identification data block IDB=0 . . . 01837 only the part NKP-IDB=0 . . . 0183 of the data carrier 2 (DC) with the identification data block IDB=0 . . . 01837 not yet known in the communication station 1 is transmitted to the communication station 1, whereas the part "7" of the identification data block IDB=0 . . . 01837 is no longer transmitted to the communication station 1. This is not required because the time slot sequence of the time slots T is determined in the communication station 1, and it is therefore known in the communication station 1 that the data carrier 2 (DC) with the identification data block IDB=0 . . . 01837 can only have answered in the time slot fixed by @=7, and therefore the combination, determining the time slot, must form the corresponding part of the identification data block IDB at four (4) bits given by @=7, which means in the case just described that this is the least significant half byte (nibble) of the identification data block IDB=0 . . . 01837, i.e. @=7.

Those data carriers 2 (DC) which—as described above—have transmitted data to the communication station 1 in the time slot given by @=2 also have not transmitted the least significant half byte (nibble) @=2 of their identification data block IDB to the communication station 1.

The second procedure run with the duration TPR2 is subsequently started, it being ensured in a known way in advance that the data carrier 2 (DC) with the identification data block IDB=0 . . . 01837 can no longer participate in the second procedure run with the duration TPR2. As a consequence of this, only six data carriers 2 (DC) still participate in the second procedure run with the duration TPR2.

The second procedure run with the duration TPR2 is started by the second request data block RDB2. Included again in this second request data block RDB2 are the request command and the useful data address information, but no further details are given on this in FIG. 7. Included in the second request data block RDB2 is a mask whose mask size is four (4) bits, the mask value in hexadecimal notation being equal to "2". The mask value "2" results from the value @=2 and is fixed, just like the mask size, by the mask generating means 24. In this case, the time slots in which the six data carriers 2 (DC) still remaining and still to be inventorized must communicate with the communication station 1 are determined in each case by the second four (4) bits of their identification data block IDB. In the example given here, this means that the time slots T are determined in hexadecimal notation by @=3 and @=4 and @=A.

No collision occurs in the time slot given by @=4, which results in the data carrier 2 (DC) with the identification data block IDB=0 . . . 02842 transmitting the data 0 . . . 028+n×UDB to the communication station 1 and being inventorized in the communication station 1 on the basis of these data. As may be seen, the data carrier 2 (DC) with the identification data block IDB=0 . . . 02842 transmits only the part NKP-IDB=0 . . . 028 of its identification data block IDB=0 . . . 02842 not yet known in the communication station 1 to the communication station 1. There is consequently no need to transmit the part "42" of its identification data block IDB=0 . . . 02842 to the communication station 1, because it is already known in the communication station 1 from the procedure run previously carried out with the duration TPR1 that the data carrier 2 (DC) with the identification data block IDB=0 . . . 02842 has communicated in the time slot fixed by @=2, and that the data carrier 2 (DC) with the identification data block IDB=0 . . . 02842 has answered in the time slot fixed by @=4 in the procedure run that has just expired with the duration TPR2. This means, in other words, that the two least significant half bytes (nibbles) of its identification data block IDB=0 . . . 02842 can only be "42" in hexadecimal notation. It is therefore unnecessary for these two least significant half bytes (nibbles) to be transmitted to the communication station 1.

During the second procedure run with the duration TPR2, one collision occurs in each of the time slots given by @=3 and @=A, i.e. because the three data carriers 2 (DC) with the identification data blocks IDB=0 . . . 02832, IDB=0 . . . 09532, and IDB=0 . . . 01532 communicate simultaneously in the time slot fixed by @=3, and because the two data carriers 2 (DC) with the identification data blocks IDB=0 . . . 049A2 and IDB=0 . . . 068A2 communicate simultaneously in the time slot fixed by @=A. As may be seen from FIG. 7, in the case of the communication of five data carriers 2 each participating in one collision, these data carriers 2 likewise transmit only the part NKP-IDB, not yet known in the communication station 1, of their identification data block IDB to the communication station 1, specifically the parts 0 . . . 028, 0 . . . 095, 0 . . . 015, 0 . . . 049 and 0 . . . 068.

The occurrence of the collisions in the time slots given by @=3 and @=A is detected in the communication station 1 by the collision detecting means 8, as a result of which further procedure runs are triggered, specifically owing to the fact that the collision detecting means 8 output a relevant item of information NPR to the request generating means 6. As may be seen from the top part of FIG. 8, this results in a third procedure run with the time period TPR3 being started.

The third request data block RDB3, the request command and useful data address information of which are not examined in FIG. 8, is generated at the beginning of this third procedure run with the time period TPR3. The third request data block RDB3 includes a mask whose mask size is eight (8) bits and whose mask value is "32" in hexadecimal notation. The mask value "32" results from the two values @=2 and @=3, and is fixed just like the mask size by the mask generating means 24. In this case, the time slots in which the three data carriers 2 (DC) participating in the third procedure run with the duration TPR3 must communicate with the communication station 1 are determined by the third four (4) bits of their identification data blocks IDB; i.e. the time slots are given by @=8 and @=5 in hexadecimal notation.

In the time slot given by @=8, only the data carrier 2 (DC) with the identification data block IDB=0 . . . 02832 communicates with the communication station 1, so no collision occurs and this data carrier 2 (DC) communicates to the communication station 1 only the data NKP-IDB=0 . . . 02+n×UDB not yet known in the communication station 1, and is inventorized on the basis of this data. In this case, the communication of the part KP-IDB=832 of the identification data block IDB=0 . . . 02832 already known in the communication station 1 is saved, which is possible because it is known in the communication station 1 that the data carrier 2 (DC) with the identification data block IDB=0 . . . 02832 has communicated in the time slot given by @=2 in the first procedure run with the duration TPR1, in the time slot given by @=3 in the second procedure run with the duration TPR2, and in the time slot given by @=8 in the third procedure run that is now running with the duration TPR3.

In the third procedure run with the duration TPR3, a collision will occur anew in the time slot fixed by @=5, and this, in turn, is detected by the collision detecting means 8 and results in a fourth procedure run with the duration TPR4.

The fourth request data block RDB4 is generated at the beginning of the fourth procedure run with the duration TPR4. Included in this fourth request data block RDB4 is a mask whose mask size is twelve (12) bits and whose mask value is "532" in hexadecimal form. The mask value "532" results from the values @=2, @=3, and @=5 of those time slots in which the two data carriers 2 (DC) with the identification data blocks IDB=0 . . . 09532 and IDB=0 . . . 01532 have previously communicated with the communication station 1, but without success, because a collision occurred in each case. In this case, the time slots in which the two data carriers 2 (DC) participating in the fourth procedure run with the duration TPR4, must communicate with the communication station 1 are given by the fourth four (4) bits of their identification data blocks IDB, that is to say by @=9 and @=1 in hexadecimal notation.

No collision occurs in this case both in the time slot given by @=1 and in the time slot given by @=9. In this case, the identification data block IDB of the data carrier 2 (DC) with the identification data block IDB=0 . . . 01532 communicates to the communication station 1 and utilizes for inventorization only the part NKP-IDB=0 . . . 0 not yet known in the communication station 1, and the specific useful data n×UDB. In a similar way, the data carrier 2 (DC) with the identification data block IDB=0 . . . 09532 no longer communicates the part "9532" to the communication station 1 at all, but only the preceding part NKP-IDB=0 . . . 0 of its identification data block IDB=0 . . . 09532 and the specific useful data blocks n×UDB. This concludes the fourth procedure run with a duration TPR4.

However, it is already known in the communication station 1, specifically from the second procedure run with the time period TRP2, that a collision has occurred in the time slot fixed by @=A during the second procedure run with the duration TPR2. A further procedure run, specifically a fifth procedure run with the duration TPR5 is therefore started. At the beginning of this fifth procedure run, the fifth request data block RDB5 is generated and output by the communication station 1. The fifth request data block RDB5 includes a mask which has a mask size of eight (8) bits and a mask value of "A2" in hexadecimal notation. The mask value "A2" is given by the values @=2 and @=4, which correspond to those time slots in which a collision has occurred in the first procedure run with the duration TPR1 and the second procedure run with the duration TPR2 respectively. The mask value "A2" and the mask size are fixed by the mask generating means 24. In this case, the time slots in which the two data carriers 2 (DC), not yet inventorized, with the identification data blocks IDB=0 . . . 049A2 and IDB=0 . . . 068A2 must communicate with the communication station 1, are given by the values @=9 and @=8 in hexadecimal notation. In the fifth procedure run with the duration TPR5, no collision occurs either in the time slot given by the value @=8 or in the time slot given by the value @=9. Consequently, the data carrier 2 (DC) with the identification data block IDB=0 . . . 068A2 now communicates to the communication station 1 only the parts KP-IDB= 0 . . . 06 lying in front of the part KP-IDB=8A2 of its identification data block IDB=0 . . . 068A2 and the specific useful data blocks n×UDB. In a similar way, the data carrier 2 (DC) with the identification data block IDB=0 . . . 049A2 now communicates to the communication station 1 only the parts NKP-IDB=0 . . . 04 lying in front of the part KP-IDB=9A2 of its information data block IDB=0 . . . 049A2 and the specific useful data blocks n×UDB, such that it is then still also possible to inventorize the two last data carriers 2 (DC).

In the method described above, all seven data carriers 2 (DC) are inventorized in an unequivocally identified way after a total of five procedure runs. It merely remains to add with reference to this inventorization that the respective unknown parts NKP-IDB of the identification data blocks IDB of the seven participating data carriers 2 (DC) are fed to the identification data block regenerating means 9, which identification data block regenerating means 9 are additionally fed the parts KP-IDB, already known in the communication station 1, of the identification data blocks IDB by the request generating means 6 and the mask generating means 24 thereof, whereupon the identification data block regenerating means 9 ensure regeneration of the entire identification data block IDB of each inventorized data carrier 2 (DC). After the completed regeneration of the entire identification data block IDB of a data carrier 2 (DC), the regenerated identification data block IDB is fed to the combination means 11, whereupon the regenerated identification data block IDB of a data carrier 2 (DC) is combined with the specific useful data n×UDB read out from this data carrier 2 (DC) in the combination means 11. After this combination, the regenerated information data block IDB and the useful data n×UDB belonging to this identification data block IDB are stored.

As may be seen from the preceding description, it is necessary in the method described above for each data carrier 2 (DC) to have available the information as to which part NKP-IDB of its identification data block IDB is not yet known in the communication station 1, and which part NKP-IDB of its identification data block IDB of the relevant data carriers 2 (DC) is therefore to be transmitted to the communication station 1. In the example described above, this is performed by utilizing a mask transmitted from the communication station 1 to each data carrier 2 (DC), by utilizing knowledge as to the time slots T in which data transmission has taken place, and by utilizing the fact that a collision has or has not occurred or not in a time slot T. It may be mentioned at this juncture that this mode of procedure constitutes only one of several possibilities, and that other modes of procedure are also possible, for example that each data carrier 2 (DC) receives information within the framework of a permanently defined transmission protocol as to which parts NKP-IDB of its identification data block IDB are not yet known in the communication station 1. The required information may be made available automatically in accordance with an arrangement fixed by means of a communications protocol, there then being no need to send a mask from the communication station 1 to the data carrier 2 (DC).

In the case of the method described above, the specific useful data n×UDB transmitted from each data carrier 2 (DC) to the communication station 1 are fixed in that each request data block RDB includes an item of request information which, in the case described, is given by the specification of a useful data start block and the specification of a specific number n of useful data blocks. However, it is also possible to select a design in which no request for useful data is made by the communication station 1, but in which automatically either all the useful data stored in a data carrier 2 (DC), or automatically a specific selection of useful data blocks UDB are transmitted from each data carrier 2 (DC) to the communication station 1.

In the explanation of the method with reference to FIGS. 7 and 8, it is always only n×UDB of the specific useful data that are referred to, but this does not mean that all the data carriers 2 (DC) transmit the same useful data to the communication station 1.

In the method described above, the part NKP-IDB of the identification data block IDB of a data carrier 2 (DC) not yet known in the communication station 1 is always transmitted in conjunction with the useful data requested in the present case. This need not necessarily be the case, because it is possible in a modification of the above method to provide, after the transmission of the not yet known part NKP-IDB of the identification data block IDB from a data carrier 2 (DC) to the communication station 1, a short waiting time which is provided in order to suppress a subsequent transmission of requested or automatically fixed useful data if a collision is established during the transmission of the not yet known part NKP-IDB of the identification data block IDB of a data carrier 2 (DC).

In a method in accordance with the invention, it is possible during each procedure run to transmit to the communication station 1 not only the part NKP-IDB of the identification data block IDB of a data carrier 2 (DC) not yet known in the communication station 1, but also always to transmit the entire identification data block IDB, the result then still being the significant advantage that the identification data block IDB and the associated specific useful data n×UDB of a data carrier 2 (DC) are transmitted from the relevant data carrier 2 (DC) to the communication station 1 in one transmission operation.

In the method described above, the entire not yet known block region NKP-IDB of the identification data block IDB of a data carrier 2 (DC), i.e. the entire unknown part NKP-IDB of the identification data block IDB of a data carrier 2 (DC), is always transmitted from the relevant data carrier 2 (DC) to the communication station 1. It may be expressly stated here that this is not absolutely necessary. In a method in accordance with the invention, it is also possible to proceed such that it is not the entire as yet unknown part NKP-IDB of an identification data block IDB of a data carrier 2 (DC) that is transmitted to the communication station 1, but only part of the entire unknown part NKP-IDB of an identification data block IDB, and this is possible, for example, without disadvantages whenever special data are included in an identification data block IDB which are not in any way necessary for specific applications of the data carrier 2 (DC), which are nevertheless stored in the data carrier 2 (DC) because they are useful or absolutely necessary for other applications, and for which special data from the identification data block IDB it is possible to omit the transmission to the communication station 1. However, in a method in accordance with the invention it is possible to transmit only a part of the entire as yet known part NKP-IDB of an identification data bock IDB from a data carrier 2 (DC) to the communication station 1, because in this method the aim is chiefly to achieve a particularly short total communication duration, which aim admittedly impairs security with reference to unique identification and/or inventorization, but this may be quite acceptable in many applications.

It still remains to mention that what is termed a time slot mode is implemented in the method described above. Such a time slot mode is also frequently designated the time diversity mode. It is to be expressly pointed out that a frequency-diversity mode or a code-diversity mode may also be applied instead of such a time-diversity mode, the communication then being carried out for the purpose of distributing a plurality of data carriers 2 (DC) in the former case between a plurality of data carriers 2 (DC) and a communication station 1 on the basis of different carrier frequencies and communication being carried out in the latter case between a plurality of data carriers 2 (DC) and a communication station 1 on the basis of different coding forms.

It may also be mentioned that time windows may have a time duration independent of the data transmission requirements, the result of this being that if no data at all are transmitted in a time window—this relevant time window is terminated without delay after a very short detection time period.

The invention claimed is:

1. A method of communicating between a communication station (1) and at least one data carrier (2 (DC)), which data carrier (2 (DC)) comprises a characteristic identification data block (IDB) and useful data (UD), by said method an inventorization procedure is carried out, the inventorization procedure may consist of successive procedure runs and consists of at least one procedure run, and after the inventorization procedure terminates, at least one part of the identification data block (IDB) of the at least one data carrier (2 (DC)) is known in the communication station (1), and by which method a transmission of specific useful data (n×UDB) is carried out from the at least one data carrier (2 (DC)) to the communication station (1) such that during the implementation of the inventorization procedure at least one part of a block region (NKP-IDB) of the identification data block (IDB) not yet known in the communication station (1) and, in addition, said specific useful data (n×UDB) are transmitted from the at least one data carrier (2 (DC)) to the communication station (1).

2. A method as claimed in claim 1, wherein during the implementation or the inventorization procedure the entire block region (NKP-IDB) of the identification data block (IDB) not yet known in the communication station (1) and, in addition, the specific useful data (n×UDB) are transmitted from the at least one data carrier (2 (DC)) to the communication station (1).

3. A method as claimed in claim 2, wherein during the implementation of the inventorization procedure the entire identification data block and, in addition, the specific useful data are transmitted from the at least one data carrier to the communication station.

4. A method as claimed in claim 1, wherein the specific useful data (n×UDB) are transmitted in time after the data (NKP-IDB) from the identification data block (IDB).

5. A method as claimed in claim 1, wherein the specific useful data (n×UDB) are transmitted immediately after the data (NKP-IDB) from the identification data block (IDB).

6. A method of communicating between a communication station (1) and at least one data carrier (2 (DC)), which data carrier (2 (DC)) comprises a characteristic identification data block (IDB) and useful data (UD), by said method an inventorization procedure is carried out, the inventorization procedure may consist of successive procedure runs and consists of at least one procedure run, and after the inventorization procedure terminates, at least one part of the identification data block (IDB) of the at least one data carrier (2 (DC)) is known in the communication station (1), and by which method a transmission of specific useful data (n×UDB) is carried out from the at least one data carrier (2 (DC)) to the communication station (1) such that during the implementation of the inventorization procedure at least one part of a block region (NKP-IDB) of the identification data block (IDB) not yet known in the communication station (1) and, in addition, said specific useful data (n×UDB) are transmitted from then at least one data carrier (2 (DC)) to the communication station (1), wherein the length of the block region (NKP-IDB) of the identification data block (IDB) of a data carrier (2 (DC)) not yet known in the communication station (1) is a function of the number of procedure runs carried out, and wherein this length becomes smaller as the number of procedure runs carried out rises.

7. A communication station (1) for communicating with at least one data carrier (2 (DC)), which data carrier (2 (DC)) comprises a characteristic identification data block (IDB) and useful data (UD), which communication station (1) comprises inventorization means (5) for carrying out an inventorization procedure, which inventorization means (5) are designed for carrying out successive procedure runs in an inventorization procedure, and in which inventorization means at least one part of the identification data block (IDB) of the at least one data carrier (2 (DC)) is known after termination of an inventorization procedure, and which communication station (1) comprises processing means (10, 11) for processing specific useful data (n×UDB) included in the at least one data carrier (2 (DC)), transmitted to the communication station (1), and received in the communication station (1), wherein the communication station (1) is designed for processing at least one part of a block region (NKP-IDB) of the identification data block (IDB) of the at least one data carrier (2 (DC)) not yet known in the communication station (1) and, in addition, specific useful data (n×UDB) of the at least one data carrier (2 (DC)) during the implementation of an inventorization procedure.

8. A communication station (1) as claimed in claim 7, wherein the communication station (1) is designed for processing the entire block region (NKP-IDB) of the identification data block (IDB) of the at least one data carrier (2 (DC)) not yet known in the communication station (1) and, in addition, the specific useful data (n×UDB) of the at least one data carrier (2 (DC)) during the implementation of an inventorization procedure.

9. A communication station as claimed in claim 8, wherein the communication station is designed for processing the entire identification data block of the at least one data carrier and, in addition, the specific useful data of the at least one data carrier during the implementation of an inventorization procedure.

10. A communication station (1) as claimed in claim 7, in wherein the communication station (1) is designed for processing first the data (NKP-IDB) from the identification data block (IDB) of the at least one data carrier (2 (DC)) and, thereafter, the specific useful data (n×UDB) of the at least one data carrier (2 (DC)).

11. A station circuit (3) for a communication station (1) for communicating with at least one data carrier (2 (DC)), which data carrier (2 (DC)) comprises a characteristic identification data block (IDB) and useful data (UD), which station circuit (3) comprises inventorization means (5) for carrying out an inventorization procedure, which inventorization means (5) are designed for carrying out successive procedure runs in an inventorization procedure, and in which inventorization means at least one part of the identification data block (IDB) of the at least one data carrier (2 (DC)) is known after termination of an inventorization procedure, and which station circuit (3) comprises processing means (10, 11) for processing specific useful data (n×UDB) included in the at least one data carrier (2 (DC)), and transmitted to the station circuit (3), and received in the station circuit (3), wherein the station circuit (3) is designed for processing at least one part of a block region (NKP-IDB), not yet known in the communication station (1), of the identification data block (IDB) of the at least one data carrier (2 (DC)) and, in addition, the specific useful data (n×UDB) of the at least one data carrier (2 (DC)) during the carrying out of an inventorization procedure.

12. A station circuit (3) as claimed in claim 11, wherein the station circuit (3) is designed for processing the entire block region (NKP-IDB) of the identification data block (IDB) of the at least one data carrier (2 (DC)) not yet known in the station circuit (3) and, in addition, the specific useful data (n×UDB) of the at least one data carrier (2 (DC)) during the implementation of an inventorization procedure.

13. A station circuit as claimed in claim 12, wherein the station circuit is designed for processing the entire identification data block of the at least one data carrier and, in addition, the specific useful data of the at least one data carrier during the implementation of an inventorization procedure.

14. A station circuit (3) as claimed in claim 11, wherein the station circuit (3) is designed for processing first the data (NKP-IDB) from the identification data block (IDB) of the at least one data carrier (2 (DC)), and thereafter the specific useful data (n×UDB) of the at least one data carrier (2 (DC).

15. A data carrier (2 (DC)) for communicating with a communication station (1), in said data carrier (2 (DC)) a characteristic identification block (IDB) and useful data (UD) are stored, and said data carrier (2 (DC)) is designed for carrying out an inventorization procedure, the inventorization procedure may consist of successive procedure runs and consists of at least one procedure run, and after the inventorization procedure terminates, at least one part of the identification data block (IDB), included in the data carrier (2 (DC)) after the at least one part of the identification data block's storage, of the data carrier (2 (DC)) is known in the communication station (1), and which data carrier (2 (DC)) comprises output means (40, 34, 32, 25) for outputting to the communication station (1) specific useful data (n×UDB) included in the data carrier (2 (DC)) after the specific useful data's storage, wherein the data carrier (2 (DC)) is designed for outputting at least one part of a block region (NKP-IDB), not yet known in the communication station (1) of the identification data block (IDB) of the data carrier (2 (DC)) included in the data carrier (2 (DC)) after the identification data block's (IDB) storage, in addition, specific useful data (n×UDB) of the data carrier (2 (DC)) included in the data carrier (2(DCC)) after the specific useful data's (n×UDB) storage.

16. A data carrier (2 (DC)) as claimed in claim 15, wherein the data carrier (2 (DC)) is designed for outputting the entire block region (NKP-IDB), not yet known in the communication station (1), of the identification data block (IDB), included in the data carrier (2 (DC)) after the identification data block's (IDB) storage, of the data carrier (2 (DC)) and, in addition, specific useful data (n×UDB), included in the data carrier (2 (DC)) after the specific useful data's (n×UDB) storage, of the data carrier (2 (DC)) during the implementation of the inventorization procedure.

17. A data carrier as claimed in claim 16, wherein the data carrier is designed for outputting the entire identification data block, included in the data carrier after the entire identification data block's storage, of the data carrier and, in addition, specific useful data, included in the data carrier after the specific useful data's storage, of the data carrier during the implementation of the inventorization procedure.

18. A data carrier (2 (DC)) as claimed in claim 15, wherein the data carrier (2 (DC)) is designed for outputting first the data (NKP-IDB) from the identification data block (IDB), included in the data carrier (2 (DC)) after the identification data block's (IDB) storage, of the data carrier (2 (DC)) and thereafter the specific useful data (n×UDB), included in the data carrier (2 (DC)) after the specific useful data's (n×UDB) storage, of the data carrier (2(DC)).

19. A data carrier circuit (28) for a data carrier (2 (DC)) for communicating with a communication station (1), said data carrier circuit (28) is arranged for storing a characteristic identification data block (IDB) and useful data (UD), and said data carrier circuit (28) is designed for carrying out an inventorization procedure, said inventorization procedure may consist of successive procedure runs and consists of at least one procedure run, and after the inventorization procedure terminates, at least one part of the identification data block (IDB), included in the data carrier circuit (28) after the identification data block's (IDB) storage, of the data carrier circuit (28) is known in the communication station (1), and which data carrier circuit (28) comprises output means (40, 34, 32) for outputting specific useful data (n×UDB), included in the data carrier circuit (28) after the specific useful data's (n×UDB) storage, to the communication station (1), wherein the data carrier circuit (28) is designed for outputting at least one part of a block region (NKP-IDB), not yet known in the communication station (1), of the identification data block (IDB) of the data carrier circuit (28) included in the data carrier circuit (28) after the identification data block's (IDB) storage and, in addition, specific useful data (n×UDB) of the data carrier circuit included in the data carrier circuit (28) after the specific useful data's storage.

20. A data carrier circuit (28) as claimed in claim 19, wherein the data carrier circuit (28) is designed for outputting the entire block region (NKP-IDB), not yet known in the communication station (1), of the identification data block (IDB), included in the data carrier circuit (28) after the identification data block's (IDB) storage, of the data carrier circuit (28) and, in addition, specific useful data (n×UDB), included in the data carrier circuit (28) after the specific useful data's (n×UDB) storage, of the data carrier circuit (28) during the implementation of the inventorization procedure.

21. A data carrier circuit as claimed in claim 20, wherein the data carrier circuit is designed for outputting the entire identification data block, included in the data carrier circuit after the entire data block's storage, of the data carrier circuit and, in addition, specific useful data, included in the data carrier circuit after the specific useful data's (n×UDB) storage, of the data carrier circuit during the implementation of the inventorization procedure.

22. A data carrier circuit (28) as claimed in claim 19, wherein the data carrier circuit (28) is designed for outputting first the data (NKP-IDB) from the identification data block (IDB), included in the data carrier circuit (28) after the identification data block's (IDB) storage, of the data carrier circuit (28), and thereafter the specific useful data (n×UDB), included in the data carrier circuit (28) after the specific useful data's (n×UDB) storage, of the data carrier circuit (28).

* * * * *